(12) United States Patent
Hoare et al.

(10) Patent No.: US 7,240,751 B2
(45) Date of Patent: Jul. 10, 2007

(54) DUAL ROTOR MOTOR FOR A HYBRID VEHICLE TRANSMISSION

(75) Inventors: Graham Hoare, Northville, MI (US); Walt Ortmann, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 127 days.

(21) Appl. No.: 10/908,358

(22) Filed: May 9, 2005

(65) Prior Publication Data
US 2006/0249319 A1 Nov. 9, 2006

(51) Int. Cl.
*B60K 1/00* (2006.01)
(52) U.S. Cl. .................. 180/65.4; 180/65.1; 180/65.3
(58) Field of Classification Search ....... 180/65.2–65.4
See application file for complete search history.

(56) References Cited

U.S. PATENT DOCUMENTS

| | | | | |
|---|---|---|---|---|
| 4,533,011 A * | 8/1985 | Heidemeyer et al. | ....... | 180/65.2 |
| 5,804,935 A * | 9/1998 | Radev | ........... | 318/139 |
| 5,903,113 A | 5/1999 | Yamada et al. | | |
| 5,931,757 A | 8/1999 | Schmidt | | |
| 5,934,396 A * | 8/1999 | Kurita | ........ | 180/65.2 |
| 6,005,358 A | 12/1999 | Radev | | |
| 6,098,735 A * | 8/2000 | Sadarangani et al. | ...... | 180/65.2 |
| 6,149,544 A | 11/2000 | Masberg et al. | | |
| 6,501,190 B1 * | 12/2002 | Seguchi et al. | ........ | 290/46 |
| 6,585,066 B1 | 7/2003 | Koneda et al. | | |
| 6,656,082 B1 | 12/2003 | Yamada et al. | | |
| 6,710,492 B2 | 3/2004 | Minagawa | | |
| 6,910,981 B2 * | 6/2005 | Minagawa et al. | ........... | 475/5 |
| 7,063,637 B2 * | 6/2006 | Yamauchi et al. | ........... | 475/5 |
| 2001/0008354 A1 | 7/2001 | Minagawa | | |
| 2002/0100624 A1 | 8/2002 | Joong et al. | | |
| 2002/0117926 A1 | 8/2002 | Joong et al. | | |
| 2002/0117927 A1 | 8/2002 | Kim et al. | | |
| 2002/0117933 A1 | 8/2002 | Joong et al. | | |
| 2003/0019674 A1 * | 1/2003 | Duan | ........... | 180/65.3 |
| 2003/0073534 A1 * | 4/2003 | Oshidari et al. | ............ | 475/5 |
| 2004/0021390 A1 | 2/2004 | Kim et al. | | |
| 2004/0124021 A1 * | 7/2004 | Shirai et al. | .............. | 180/65.2 |
| 2006/0175103 A1 * | 8/2006 | Iida et al. | .................. | 180/65.4 |

FOREIGN PATENT DOCUMENTS

| | | |
|---|---|---|
| EP | 1 145 896 A1 | 10/2001 |
| EP | 1 637 381 A2 | 3/2006 |
| GB | 2 305 405 A | 4/1997 |
| JP | 2005186733 A * | 7/2005 |

* cited by examiner

*Primary Examiner*—Christopher P. Ellis
*Assistant Examiner*—Katy Meyer
(74) *Attorney, Agent, or Firm*—David B. Kelley; Brooks Kushman P.C.

(57) ABSTRACT

A hybrid electric vehicle powertrain has an engine and a motor at the torque input side of a power transmission. The motor has a single stator and dual rotors. A selectively engageable rotor clutch connects the rotors together for torque delivery during a driving mode. During a key start and a rolling start of the engine, the rotor clutches are selectively engaged and released.

13 Claims, 3 Drawing Sheets

| FRICTION ELEMENT APPLICATION ||||||| 
| GEAR | RC | FC | DC | L,R | 2/4 | RATIO |
|---|---|---|---|---|---|---|
| 1st |  | X |  | X |  | 2.809 |
| 2nd |  | X |  |  | X | 1.571 |
| 3rd |  | X | X |  |  | 1.00 |
| 4th |  |  | X |  | X | 0.698 |
| REV | X |  |  | X |  | 2.310 |
| X = ELEMENT TRANSMITS TORQUE |||||||

| MODE | LAUNCH CLUTCH | ROTOR CLUTCH | ENGINE CLUTCH |
|---|---|---|---|
| KEY START | OFF | ON | CONTROLLED |
| ROLLING START | ON | OFF | CONTROLLED |
| ROLLING - ENG. STARTED | ON | CONTROLLED | ON |
| REGEN. BRAKING | ON | ON | OFF |
*Fig. 2a*
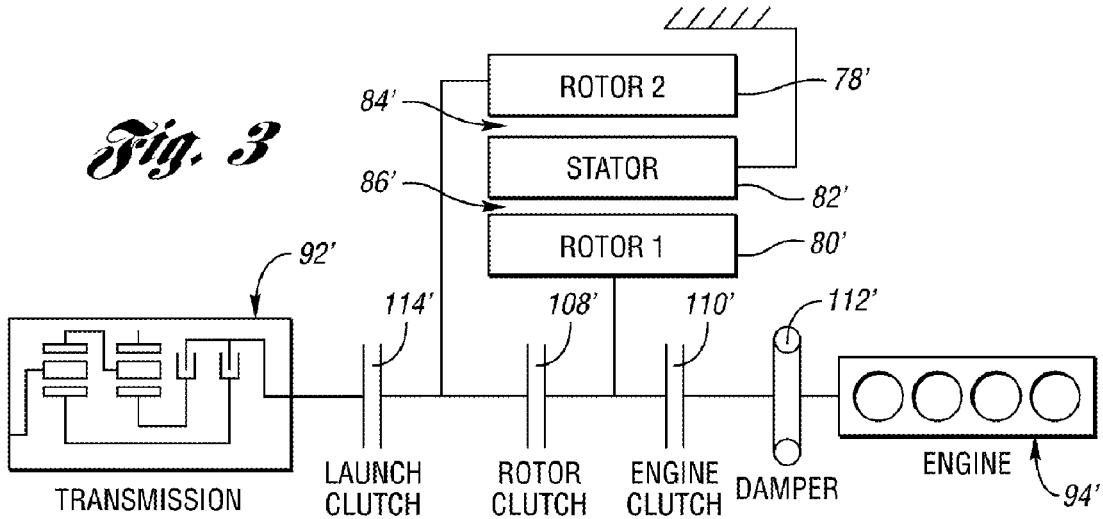
*Fig. 3*
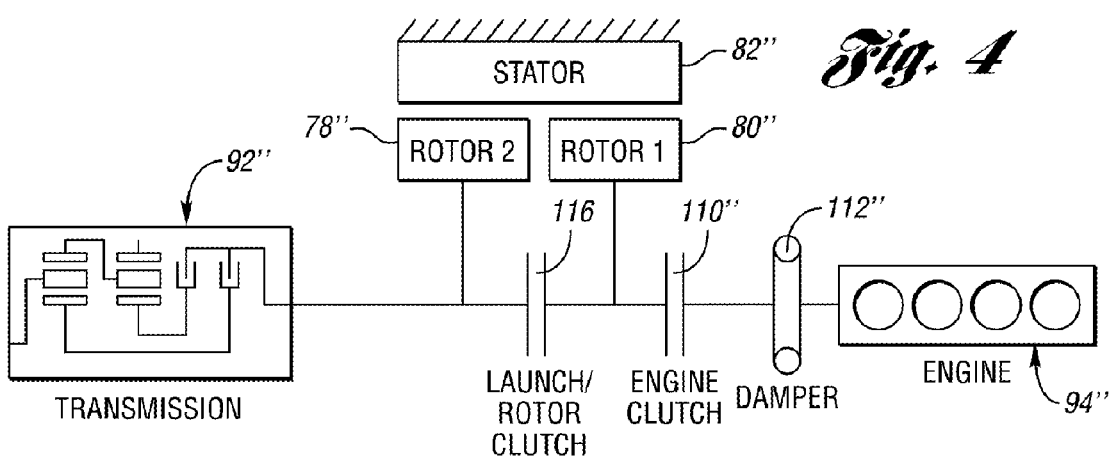
*Fig. 4*

DUAL ROTOR MOTOR FOR A HYBRID VEHICLE TRANSMISSION

BACKGROUND OF THE INVENTION

1. Field of the Invention

The invention comprises a traction motor with a single stator and two rotors for use in a hybrid vehicle powertrain to complement power delivered to traction wheels by an internal combustion engine.

2. Background Art

Hybrid electric vehicle powertrains have been developed for contemporary automotive vehicles to improve hydrocarbon fuel efficiency and to reduce undesirable exhaust gas emissions. An electrical induction motor and battery subsystem is especially adaptable for such hybrid electric vehicle powertrains because of the robustness and compact size of an induction motor. Further, an induction motor has reasonably high efficiency and design simplicity. It can be controlled using known control technology so that the most efficient operating range of the motor and the most efficient operating range of the engine are used during vehicle traction torque delivery. Further, regenerative braking is available.

It is possible in powertrains of this type to use multiple motor drives, which require two power inverters together with a common motor controller. The use of multiple motors, however, increases the manufacturing cost and creates packaging problems in an automotive vehicle powertrain. The requirement for a separate power inverter for each motor also causes undesirable complexities in the overall powertrain design.

U.S. Pat. No. 6,585,066 discloses a multiple ratio power transmission mechanism for use in a hybrid electric vehicle wherein an induction motor is located in a torque flow path between an internal combustion engine and a multiple ratio transmission. The motor and the engine define parallel power flow paths to the torque input side of the transmission. The transmission includes planetary gearing with clutch and brake mechanisms for establishing plural torque flow paths through the transmission to the vehicle traction wheels. An engine clutch is used to disconnect the engine from the powertrain when the vehicle stops or coasts. When the vehicle operates under low power driving conditions, the power flow path from the motor may be used exclusively. Energy may be recovered during coasting when the vehicle operates in a coast braking mode. Under heavy throttle acceleration conditions, the added torque available from the motor augments torque developed by the internal combustion engine.

In a powertrain of the kind disclosed in U.S. Pat. No. 6,585,066, the motor can be used to drive the vehicle if the engine clutch is off. When the engine clutch is on, the motor and the engine can both drive the vehicle as torque flow paths are developed by the transmission gearing. When the electric motor is driving the vehicle and the power demand requires the engine to be started, the motor must not only maintain the required torque level at the wheels, but it must also overcome the torque required to compress the engine fuel-air charge in the engine cylinders as well as the friction of the engine. This added torque demand on the motor, which is temporary during the engine starting cycle, may cause a sharp reduction in driveline torque. This can cause undesirable torsional oscillations in the driveline.

SUMMARY OF THE INVENTION

The torsional oscillations in a driveline for a hybrid electric vehicle that may be experienced during a rolling engine start is reduced or eliminated by the present invention. The rotor for the induction motor of the present invention comprises a dual rotor assembly with a single stator. The single rotor of the motor disclosed in the '066 patent is replaced in the design of the present invention by two rotors with a single stator and a single inverter. The two rotors operate independently, or they can be mechanically connected through a clutch, hereinafter referred to as a rotor clutch. Torsional dynamics during an engine start are isolated mechanically from the driveline. When the rotors are operated independently, their relative speeds will depend on the torque load of each motor.

One rotor can be designed and sized with a capacity to start the engine during a hot engine re-start. When the engine starting cycle is in progress, the companion rotor continues to drive the vehicle. The torsional disturbance due to the torque load required to start the engine thus is mechanically disconnected from the driveline. Any electrical coupling that may occur between the rotors due to separate flux flow paths between the rotors and the common stator is slight.

When the engine is started, the rotor used for engine starting can be mechanically connected by the rotor clutch to the companion rotor so that both rotors will develop torque at the wheels. Further, for a cold start of the vehicle, the rotors are clutched together. They also may be clutched together during regenerative braking if both rotors are needed to accommodate the regenerative braking energy.

In one alternate embodiment of the invention, the rotors are spaced axially with respect to the powertrain axis within a common stator. In another embodiment, the rotors are nested, one inside the other, thereby reducing the packaging space for the motor. In another alternate embodiment, provision is made for relative rotor slip during launch of the vehicle if it is desirable to combine the functions of the rotor clutch with the launch clutch.

BRIEF DESCRIPTION OF THE DRAWINGS

FIG. 1b is a chart showing the pattern of engagement and release of the clutches and brakes for the transmission illustrated in FIG. 1a;

FIG. 2 is a schematic representation of the hybrid electric vehicle powertrain of the present invention;

FIG. 2a is a chart showing the pattern of engagement and release of a launch clutch, a rotor clutch and an engine clutch during various drive modes for the powertrain schematically illustrated in FIG. 2;

FIG. 3 is an alternate embodiment of the invention wherein a single stator is used in combination with radially disposed rotors; and FIG. 4 is a second alternate embodiment of the invention wherein the function of the launch clutch and the rotor clutch are combined, and wherein the rotors are spaced axially, one with respect to the other, within a single stator.

DETAILED DESCRIPTION OF THE PREFERRED EMBODIMENT(S)

Figure 1:
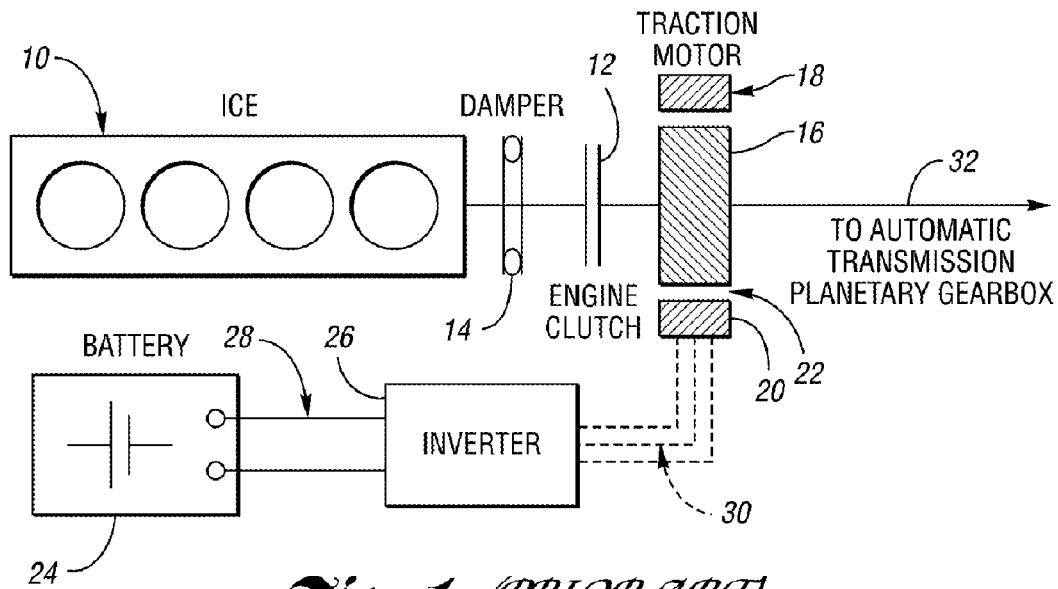
FIG. 1 is a schematic representation of a hybrid electric vehicle powertrain of the kind disclosed, for example in U.S. Pat. No. 6,585,066.

In FIG. 1, an internal combustion engine is shown schematically at 10. It is connected to an engine disconnect clutch 12 through a damper mechanism 14. The torque output side of the clutch 12 is connected to a rotor 16 for a traction motor/generator 18. The motor/generator 18 comprises a stator 20 surrounding rotor 16 with an air gap 22 between them. The stator 20 is in electrical communication with a battery 24 through an electrical inverter 26. The inverter converts voltage output 28 for the battery 24 into a three-phase voltage shown at 30, which is supplied to the stator 20.

Figure 1A:
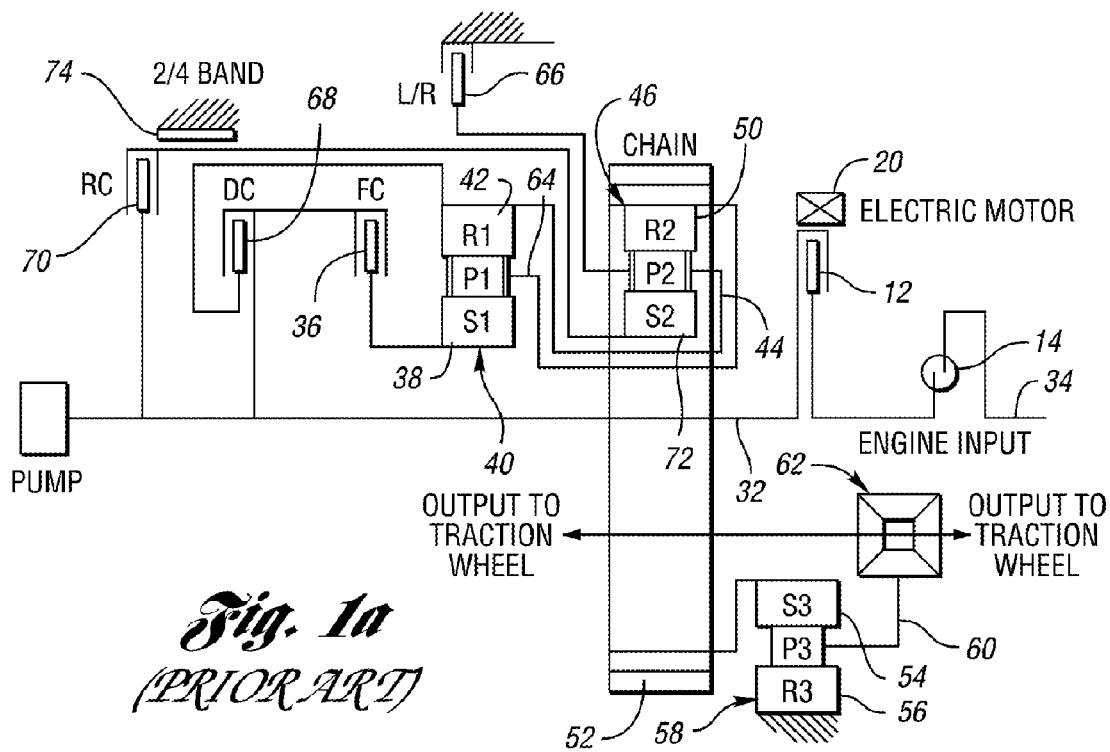
FIG. 1a is a schematic representation of a transmission that may be used in the hybrid electric vehicle powertrain schematic illustrated in FIG. 1.

The rotor 16 is mechanically connected to a torque input shaft 32 for a multiple ratio automatic transmission, which is illustrated in FIG. 1a.

FIG. 1a shows the engine crankshaft at 34. The rotor 16 rotates with transmission input shaft 32, which in turn is connected by forward clutch 36 to sun gear 38 of a first planetary gear unit 40. Gear unit 40 includes a ring gear 42, which is connected to carrier 44 of a second gear unit 46. Planetary pinions on carrier 44 engage sun gear 46 and ring gear 50. Drive chain 52 is connected to ring gear 50. It delivers torque to sun gear 54 of a final drive planetary gear unit 58. Ring gear 56 of gear unit 58 is fixed, as shown. The carrier 60 of planetary gear unit 58 is connected to an output differential mechanism 62, which delivers torque to each torque output half shaft.

The first planetary gear unit 40 includes a carrier 64, which is connected to the ring gear 50 of second planetary gear unit 46. Carrier 44 of planetary gear unit 46 can be braked by low and reverse brake 66.

Transmission input shaft 32 can be connected by direct clutch 68 to ring gear 42. It is connected by reverse clutch 70 to sun gear 72 of the second planetary gear unit 46.

Figures 1B, 2:
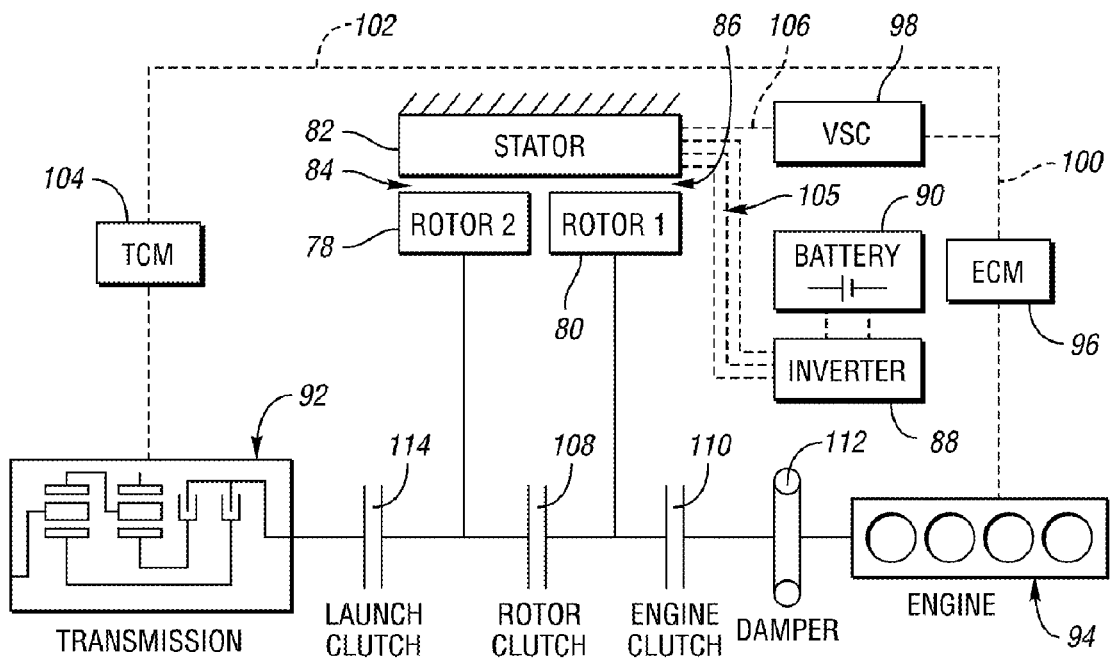

As seen in FIG. 1b, the first torque ratio for the gearing shown in FIG. 1a is established by engaging forward clutch 36 and low-and-reverse brake 66. The second ratio is obtained by releasing the low-and-reverse brake 66 and applying brake 74, which anchors sun gear 72. A ratio change from the second ratio to the third ratio is obtained by applying direct clutch 68. The forward clutch 36 maintains its engaged state during first, second and third forward driving operation.

Fourth ratio drive, which is an overdrive, is obtained by releasing forward clutch 36 and applying direct clutch 68, while simultaneously applying brake 74.

Reverse drive is achieved by applying reverse clutch 70 and the low-and-reverse brake 66 as the other friction elements are released.

FIG. 2 is an overall system block diagram for an embodiment of the invention. Unlike the design illustrated schematically in FIG. 1, the design of FIG. 2 includes two rotors 78 and 80 located within a single stator 82. Each rotor is separated from the stator by an air gap, as shown at 84 and 86. A single inverter for the stator 82 is shown at 88. The inverter is electrically coupled to battery 90.

A planetary transmission of the kind shown schematically in FIG. 1a is illustrated schematically in FIG. 2 by diagram block 92. The engine for the powertrain of FIG. 2 is shown at 94 and an electronic microprocessor controller for the engine, commonly referred to as electronic control module (ECM), is shown at 96.

An overall vehicle system controller (VSC) is schematically illustrated at 98. It is connected through data link 100 to the engine control module 96, and is connected through data link 102 to a transmission control module (TCM) at 104. The module 104 controls application and release of clutches and brakes of the kind illustrated schematically in FIG. 1a, although they are not specifically illustrated in block 92 of the system diagram of FIG. 2.

The inverter 88 is electrically coupled to stator 82 by a three-phase voltage circuit, shown schematically at 105. The vehicle system controller 98 is electrically coupled to stator 102, as shown at 106.

A rotor clutch 82, shown in FIG. 2, driveably connects rotors 78 and 80 when it is engaged. Engine 94 can be isolated from the rest of the powertrain system by disengaging engine clutch 110. When engine clutch 110 is engaged, torsional disturbances are attenuated by damper 112 located between the clutch 110 and the engine 94.

A launch clutch, which is engaged during vehicle start up, is located at the torque input side of transmission 92, as shown at 114.

During operation in the electric drive mode, the rotor clutch 108 is disengaged so that rotor 2 delivers driving torque to the torque input side of the transmission for powering the vehicle. Rotor 1 in this operating mode would be capable of starting the engine during a hot re-start as rotor torque is delivered to the engine through the engaged clutch 110. All of the torque of the motor developed at rotor 78 is used to drive the vehicle. There is no need for an allowance for torque disturbance caused by an engine start. The torsional disturbance created by an engine starting cycle is mechanically isolated from the rest of the powertrain.

FIG. 2a shows a summary of the clutch engagement pattern for the various operating modes. During a key start, launch clutch 114 is off, the rotor clutch is on and the engine clutch has controlled engagement. When the vehicle is in motion and the engine rolling start cycle is in effect, the launch clutch is on, the engine clutch has controlled engagement and the rotor clutch is off. After the vehicle reaches a steady-state condition following an engine start, the launch clutch is on, the rotor clutch has controlled engagement and the engine clutch are on.

During regenerative braking, the launch clutch and the rotor clutch are on and the engine clutch is off.

FIG. 3 shows another embodiment of the invention wherein the rotors and the stator are nested in relative radial disposition. The reference numerals used to identify the elements of the embodiment of FIG. 3 are the same as the reference numerals used in describing the embodiment of FIG. 2, although the rotors and the stator are identified by numerals with prime notations.

In the embodiment of FIG. 4, the rotors are arranged in axial relative disposition as in the case of the embodiment of FIG. 2. Reference numerals used in the embodiment of FIG. 4 carry double prime notations to correspond to numerals for corresponding elements of the embodiment of FIG. 2.

It will be apparent to persons skilled in the art that modifications may be made without departing from the scope of the invention. All such modifications and equivalents thereof are intended to be covered by the following claims.

What is claimed is:

1. A hybrid electric vehicle powertrain comprising an internal combustion engine and an electric traction motor;
   a power transmission for delivering power from the engine and the motor to vehicle traction wheels;
   a battery system electrically coupled to the motor;
   the traction motor having two rotors and a single stator, the rotors being disposed adjacent the stator with an air gap between each rotor and the stator;

a launch clutch in a torque flow path between a torque input element of the power transmission and one of the two rotors;
a rotor clutch between the two rotors whereby rotor torque of one of the two rotors is combined with rotor torque of the other rotor; and
a selectively engageable engine clutch disposed in a torque flow path for the engine.

2. A hybrid electric vehicle powertrain comprising an internal combustion engine and an electric traction motor on a common axis;
a power transmission for delivering power from the engine and the motor to vehicle traction wheels;
a battery system electrically coupled to the traction motor;
the motor having two rotors and a single stator, the rotors being disposed adjacent the stator with an air gap between each rotor and the stator;
an engine disconnect clutch between the engine and a first of the two rotors;
a launch clutch between a second of the two rotors and the transmission; and
a rotor clutch between the two rotors whereby rotor torque for one of the rotors may be combined with rotor torque for the other of the two rotors.

3. The hybrid electric vehicle powertrain set forth in claim 1 wherein the two rotors are disposed within the stator;
the rotor clutch having a rotary axis;
the rotors being relatively axially disposed for rotation about the rotary axis; and
the stator surrounding the rotors.

4. The hybrid electric vehicle powertrain set forth in claim 2 wherein the two rotors are disposed within the stator;
the rotor clutch having a rotary axis;
the rotors being relatively axially disposed for rotation about the rotary axis; and
the stator surrounding the rotors.

5. The hybrid electric vehicle powertrain set forth in claim 2 wherein the rotors are radially disposed with respect to the stator, one of the two rotors being disposed within the stator and the other of the two rotors surrounding the stator whereby the overall axial dimension of the traction motor is reduced.

6. The hybrid electric vehicle powertrain set forth in claim 1 wherein the launch clutch and the rotor clutch comprise common torque input and torque output elements.

7. The hybrid electric vehicle powertrain set forth in claim 3 wherein the launch clutch and the rotor clutch comprise common torque input and torque output elements.

8. The hybrid electric vehicle powertrain set forth in claim 1 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

9. The hybrid electric vehicle powertrain set forth in claim 2 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

10. The hybrid electric vehicle powertrain set forth in claim 4 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

11. The hybrid electric vehicle powertrain set forth in claim 5 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

12. The hybrid electric vehicle powertrain set forth in claim 6 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

13. The hybrid electric vehicle powertrain set forth in claim 7 wherein the motor is a three-phase induction motor and wherein the battery system includes a battery and a power inverter;
the power inverter electrically coupling the battery and the stator, the power inverter having a three-phase voltage output that is distributed to the stator as electrical energy is distributed from the battery to the power inverter.

* * * * *